United States Patent
French

[11] 3,866,924
[45] Feb. 18, 1975

[54] WIPER AND DIAPHRAGM SEAL DEVICE
[75] Inventor: Joseph W. French, Garland, Tex.
[73] Assignee: United States Steel Corporation, Pittsburgh, Pa.
[22] Filed: Aug. 16, 1973
[21] Appl. No.: 389,601

[52] U.S. Cl. ................... 277/59, 277/74, 277/30
[51] Int. Cl. ............................... F16j 15/34
[58] Field of Search ......... 277/165, 205, 24, 58, 59, 277/70, 79, 30

[56] References Cited
UNITED STATES PATENTS

| | | | |
|---|---|---|---|
| 1,872,665 | 8/1932 | Brownell | 277/30 |
| 1,982,252 | 11/1934 | Heggem | 277/30 |
| 3,268,232 | 8/1966 | Richards | 277/59 |
| 3,272,520 | 9/1966 | Woolfenden | 277/165 |
| 3,418,001 | 12/1968 | Rentschler et al. | 277/165 |
| 3,774,920 | 11/1973 | Sievenpiper | 277/165 |

Primary Examiner—Richard E. Aegerter
Assistant Examiner—Robert I. Smith
Attorney, Agent, or Firm—Walter P. Wood

[57] ABSTRACT

A wiper and diaphragm seal device for a reciprocating rod or shaft. Inherently the rod or shaft has limited transverse displacement. The device affords a two-way seal against fluid leaking around the rod or shaft, and it includes substantially inflexible wiper rings which closely hug the rod or shaft and float therewith on transverse displacement. Resilient O-rings encircle the wiper rings and bear against the inner circumferential face of a surrounding housing to complete the seal.

3 Claims, 1 Drawing Figure

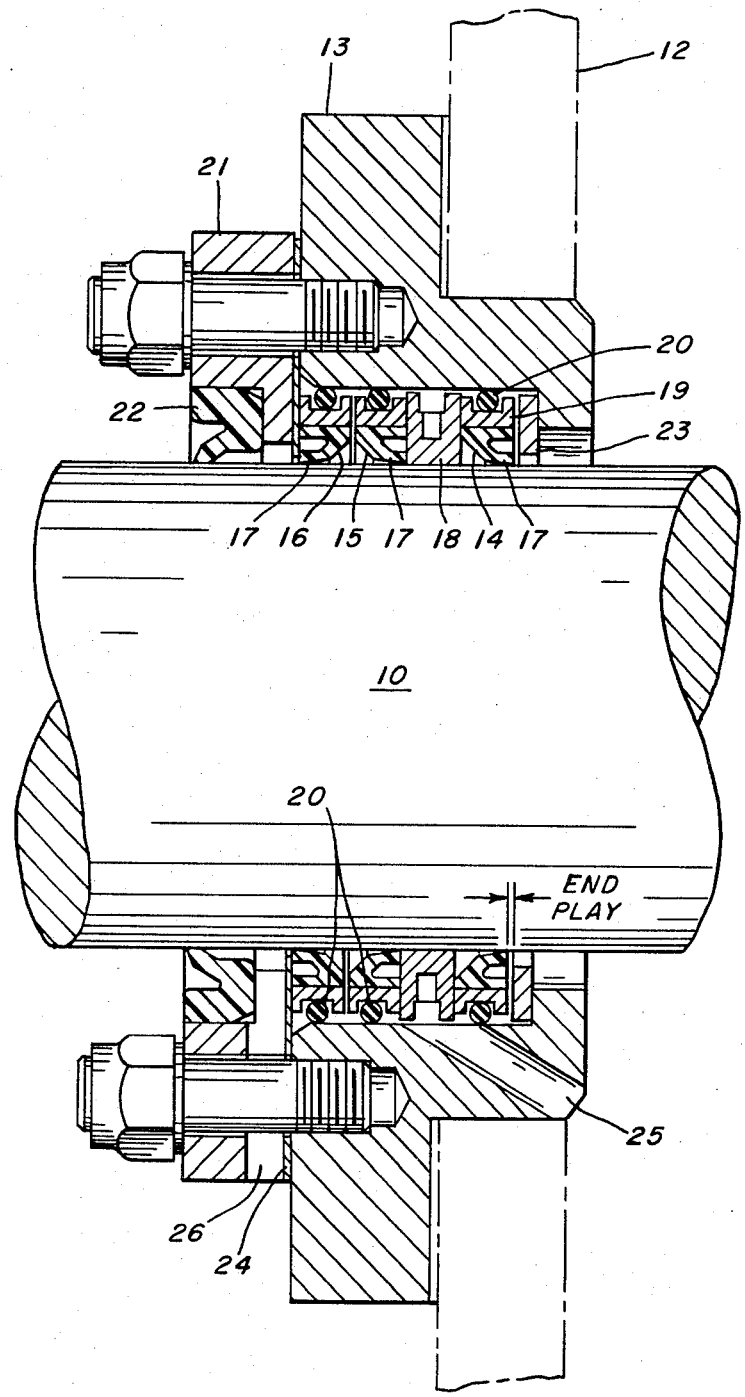

WIPER AND DIAPHRAGM SEAL DEVICE

The invention relates to an improved wiper and diaphragm seal device for a rod or shaft.

Although my invention is not thus limited, my wiper and seal device is particularly useful as applied to the rod of a reciprocating mechanism, such as a pump. In a conventional reciprocating pump an axially movable rod extends from a crosshead housed within a crankcase to a reciprocating element at the fluid end of the pump. It is necessary to encompass the rod with a two-way seal which excludes fluid handled by the pump from the crankcase, and also excludes crankcase lubricant from the fluid end. Typical wiper and seal devices used heretofore include series of wiper rings, each of which has an internal flexible lip in contact with the rod and a harder outer portion fitted within a suitable housing. Such devices become ineffective when the rod axis does not coincide with the center line of the rings. The extent to which transverse displacement of the rod axis can be tolerated depends on the amount of squeeze or interference between the lips and the rod, and the hysteresis or "memory" of the elastic lip material, and is very limited.

An object of my invention is to provide an improved wiper and seal device, the wiper rings of which float with a rod or shaft as the latter moves transversely, whereby the device is self-centering and enables a wider range of transverse displacement of the rod or shaft axis to be tolerated.

A further object is to provide an improved wiper and seal device in which the lips of the wiper rings, as well as the outer portions of the rings, are of a relatively inflexible material of a low coefficient of friction and in which the wiper rings are encircled by flexible O-rings or the like to permit a floating action.

In the drawing:

The single FIGURE is a longitudinal sectional view of a wiper and seal device constructed in accordance with my invention.

The FIGURE shows a portion of a conventional axially reciprocating rod 10, which may be, for example, the rod extending from a crosshead to the fluid end of a pump at the right and left, respectively. Neither the crosshead nor the fluid end is shown, since both may be conventional and their details are not involved in the present invention. The structure includes a diaphragm 12 and a cylindrical housing 13, which likewise are conventional. My novel wiper and seal device is mounted within this housing, where it encompasses the rod.

My wiper and seal device comprises first, second and third wiper rings 14, 15 and 16, although more such rings can be included if desired. Each ring is formed of a relatively inflexible material which has a low coefficient of friction. A suitable material is nylon impregnated with molybdenum disulphide, for example, that which is available commercially from Greene, Tweed and Co., North Wales, Pa., as "Nylatron," but numerous equivalents are possible. The rings are of U-shape in cross section and have lips 17 closely receiving rod 10. The lips of the first and second rings 14 and 15 face toward the bottom of the housing 13. The lips of the third ring 16 face in the opposite direction away from the bottom of the housing. The second and third rings 15 and 16 abut back-to-back. A conventional spacer or lantern ring 18 is interposed between the first and second rings 14 and 15. Respective metal retainer rings 19 encircle each wiper ring. Respective resilient O-rings 20 encircle each retainer ring and bear against the inner circumferential face of housing 13.

A gland 21 is bolted to the outer face of housing 13 to hold the wiper rings and other parts of the device in place. Preferably, I press-fit a fourth wiper ring 22 within gland 21. The fourth wiper ring per se may be of the construction used in conventional wiper and seal devices, that is, a flexible lip and a harder outer portion, since I do not rely on it for a seal. When I replace an existing wiper and seal device with the device of my invention, I place a washer 23 within the housing 13 against the bottom wall, but in a new installation, I do not ordinarily need this washer. I place shims 24 between the gland 21 and the outer face of housing 13, as hereinafter explained.

In operation, the first and second wiper rings 14 and 15 afford a double-seal around rod 10 as it travels toward the left. The third wiper ring 16 affords a seal around the rod as it travels toward the right and thus completes a two-way seal. Any minor quantity of fluid which leaks past the first ring 14 drains back to its source (for example, a crankcase) via a passage 25 in the housing 13. Any minor quantity of fluid which leaks past the third wiper ring 16 drains to the pump cradle via a passage 26 in gland 21. The fourth wiper ring 22 serves only to deflect heavy spray from the rod, and is not relied on as a seal. The washer 23 and shims 24 are of a thickness which permits the parts of my wiper and seal device to have limited end play, commonly of about 0.005 to 0.025 inch.

In any installation in which a crank mechanism drives rod 10, the rod inherently has limited transverse displacement. An important feature of my invention is that the lips 17 of the three wiper rings 14, 15 and 16 closely hug rod 10 to afford seals which substantially prevent leakage between rings and rod. As the rod is displaced transversely, the relatively inflexible wiper rings float with the rod and thus are self-centering with respect to the rod. The resilient O-rings 20 yield and maintain seals against the inner circumference of the housing 13. I have illustrated the O-rings as circular in cross section, but they may be of other cross-sectional shapes, such as quadseal, X-seal, oval, etc. The extent of crush imposed on the O-rings must be at least equal to the expected transverse displacement of the rod.

From the foregoing description, it is seen that my invention affords a simple self-centering wiper and seal device for a rod or shaft. The device allows the rod or shaft to be displaced transversely, and always floats with the rod or shaft. This feature is particularly desirable with a crank-driven rod in which some transverse displacement is inherent because of clearance between the crosshead and its guide and because of necessary manufacturing tolerances.

I claim:

1. In a mechanism which includes an axially movable elongated member subject to limited transverse displacement, a housing through which said member extends, a wiper and seal device within said housing encompassing said member, and means holding said device in said housing, the improvement in which said device comprises:

wiper rings of relatively inflexible material having a low coefficient of friction and being of U-shape in cross section and having lips closely hugging said member;

there being first and second wiper rings, the lips of which face in one direction to afford a double-seal as said member travels away from this direction;

there being a third wiper ring, the lips of which face in the opposite direction to afford a seal as said member travels away from the latter direction, said second and third wiper rings abutting back-to-back;

a spacer between said first and second wiper rings; and resilient means encircling said wiper rings and bearing against the inner circumferential face of said housing;

whereby said wiper rings float with said member on transverse displacement of the latter.

2. In a mechanism which includes an axially movable elongated member subject to limited transverse displacement, a housing through which said member extends, a wiper and seal device within said housing encompassing said member, and means holding said device in said housing, the improvement in which said device comprises:

wiper rings of relatively inflexible material having a low coefficient of friction and being of U-shape in cross section and having lips which extend substantially parallel with the surface of said member and closely hug said member;

the lips of at least one of said wiper rings facing in one direction and the lips of at least another of said wiper rings facing in the opposite direction to afford a two-way seal against fluid leaking in either direction around said member; and flexible resilient O-rings encircling each of said wiper rings and bearing against the inner circumferential face of said housing;

whereby said wiper rings float with said member on transverse displacement of the latter.

3. An improvement as defined in claim 2 comprising in addition respective retainer rings encircling said wiper rings and receiving the respective O-rings.

* * * * *